May 17, 1960 W. H. NEELY 2,936,822
SEATING CONSTRUCTION
Filed Dec. 16, 1957 9 Sheets-Sheet 1

Inventor
WILLIAM H. NEELY
By Gustav A. Wolff
Attorney

May 17, 1960 W. H. NEELY 2,936,822
SEATING CONSTRUCTION
Filed Dec. 16, 1957 9 Sheets-Sheet 2

Inventor
WILLIAM H. NEELY
By
Attorney

May 17, 1960 W. H. NEELY 2,936,822
SEATING CONSTRUCTION
Filed Dec. 16, 1957 9 Sheets-Sheet 3

Inventor
WILLIAM H. NEELY
By Gustav A. Wolff
Attorney

May 17, 1960 W. H. NEELY 2,936,822
SEATING CONSTRUCTION
Filed Dec. 16, 1957 9 Sheets-Sheet 9

Inventor
WILLIAM H. NEELY
By Gustav A. Wolff
Attorney

United States Patent Office 2,936,822
Patented May 17, 1960

2,936,822

SEATING CONSTRUCTION

William H. Neely, Cleveland, Ohio, assignor to Universal Incorporated

Application December 16, 1957, Serial No. 703,066

10 Claims. (Cl. 155—179)

The present invention relates generally to wire spring elements for upholstered seating constructions.

The earliest form of cushioned seat construction to receive widespread acceptance for use in the automotive industry consisted essentially of nested coil spring elements. With minor variations and detailed improvements, this type of structure was unchallenged in use for automotive seating applications for more than thirty years. The need for more simplified forms of seat structures became increasingly important to the automotive industry, and was substantially met by the adoption of zig-zag spring units and knock-down assemblies of the type typically disclosed in my Patent 2,280,480. Further developments and refinements of the basic zig-zag spring unit concept in recent years have provided acceptable seating comfort at low cost, while satisfying the demands for ruggedness and reliability in automotive applications, and have enabled the automotive industry to effectively and practically undertake seating assembly directly in their various assembly plants throughout the country.

Styling appearance has now become a factor of ruling importance in the automotive industry. As automobiles have been re-styled lower and lower, and as engineers have developed more mechanical variations affecting frame and body shape, the seating problem has become increasingly difficult. As the roofs of cars are lowered, as the transmissions are moved adjacent the rear axles, and as new air chassis suspensions and other mechanical innovations are adopted by the automotive industry for advanced performance purposes, less space is available for seating the passengers with adequate comfort through the mere use of prior known seat structures.

The lowering of car roofs by automotive stylists, and the increasing use by vehicle engineers of sharply angled ramps, large tunnels, and other irregular configurations extending upwardly into the floor pans to accommodate novel transmissions, suspensions and the like, has resulted in extreme reductions in the available inside space for static seating with little or no "extra" space for absorbing shock loading.

In order to achieve comfortable static seating within an automobile there should be sufficient inside space available to permit the spring surfaces and the supporting padding and upholstery to deflect for load support. There must be a minimum necessary spring deflection space for adequate total cushion and back penetration, under seating load pressures low enough to maintain reasonable body comfort, and at the same time there must also be still further free deflection space available to absorb shock load penetrations. It should be recognized, therefore, that any new concept in automobile seating must provide adequate seating comfort under both static and shock load conditions with relatively thin cushion and back structures; must provide rear seat foot room despite floor pan conformation and obstructions; and must achieve full shock load absorption and continuous dampening within a minimum available space.

It is the primary purpose of this invention to provide an entirely novel combination of wire spring elements for seating constructions, and particularly for the application of such constructions to automotive seating, wherein a high degree of seating comfort is achieved with a minimum of body penetration while effecting full body-supporting contact and wide distribution of loading forces. The structure and principles of the present invention permit the achievement of an entirely novel "suspended" seating function, wherein the application of body load forces to the seating construction effects independent stretch-loading of each spring element, resulting collectively in a cooperating interaction of the various cushion and back portions of the spring elements for dynamically balanced movement and yielding of the seating surfaces defined thereby. In this way, supporting contact with the body load in full conformity with the normal body load shapes is achieved, thereby providing a maximum of contacting support with full comfort and efficient shock load absorption and dampening.

The general object of the invention is the provision of a wire spring construction embodying a plurality of L-shaped wire springs arranged side by side with each wire spring including a longitudinally non-extensible yielding back rest portion suspended at one end from frame means and a longitudinally extensible yielding seat portion having its one end suspended from the free end of the longitudinally non-extensible back rest portion and its other end supported on frame means.

Another object of the invention is the provision of a wire spring construction of the type referred to above, in which each wire spring has its longitudinally extensible seat portion supported at its one end in cantilever-like fashion on the frame means in elevated position with respect thereto.

A further object of the invention is the provision of a wire spring construction of the type referred to, in which each wire spring includes in the extensible seat portion near the rear end thereof an upwardly extended sweep merging into the lower portion of the longitudinally non-extensible back rest portion of such wire spring.

Still another object of the invention is the provision of a wire spring construction of the type referred to above, in which each wire spring includes individual, partly overlapping seat and back rest portions connected to each other in cantilever-like fashion.

A still further object of the invention is the provision of a wire spring construction of the type referred to, in which each spring has its longitudinally non-extensible individual back rest portion arranged to overlap the upwardly extended sweep of the individual longitudinally extensible seat portion, and in which the overlapped portions of the back rest and seat are connected to each other to provide a cantilever-like connection when the back rest is tilted in a rearward direction and a pivot-like connection when the back rest is tilted in a forward direction.

Still another object of the invention is the provision of a wire spring construction of the type referred to, in which the diameter of the wire forming the back rests of the wire springs differentiates from the diameter of the wire forming the seat portions of the wire springs, thereby to predetermine the relative flexibility of the back rest and seat portions for dynamically balanced movement and yielding of the seating surfaces.

A still further object of the invention is the provision of a wire spring construction of the type referred to, in which the diameter of the wire forming the longitudinally non-extensible yielding back rests of the wire springs is smaller than the diameter of the wire forming the longitudinally extensible seat portions of the wire springs, to permit, under load, shaping of predetermined areas in the back rest portions for proper seating and control of stresses caused by loads and shock loads.

Still another object of the invention is the provision of a wire spring construction of the type referred to, in which the front portion of the seat portion includes yielding supporting means attached in cantilever-like fashion to the frame means of the wire spring construction in inclined position with respect thereto to avoid rearward movement of the seating portion when loaded and attain the desired fore and aft stability of the wire spring construction.

Still a further object of the invention is the provision of a wire spring construction comprising a plurality of independently movable wire spring elements of the type referred to which, in unloaded condition, collectively form a foundation adapted to support upholstery material for a predetermined trim contour and, in loaded condition, collectively effect hugging contact with the load through the upholstery material thus decreasing localized pressures and attaining a high degree of seating and resting comfort with a minimum of upholstery material.

With the above and other objects in view, the invention has certain other marked superiorities which clearly distinguish it from presently known structures and arrangements of this type. These improvements or characteristics embodying certain novel features of construction and design are clearly set forth in the appended claims and the preferred forms of embodiment of the invention hereinafter shown with reference to the accompanying drawings forming part of the specification.

In the drawings:

Figs. 13 through 17 are diagrammatic views of a wire spring unit mounted on a frame, showing different shapes of the wire spring unit in normal position when unloaded, when seat-loaded and when fully loaded, in inclined position when unloaded and when fully loaded, and in folded position; thus

Figs. 19 through 32 are diagrammatic views of a wire spring construction showing in diagrammatic cross sections shapes of the back resting portion of the wire spring construction in normal and reclined positions, unloaded and fully loaded conditions; thus

Referring more particularly to the seat spring constructions shown in the drawings, reference numeral 2 designates a front seat spring construction embodying an open frame or supporting means 3 mounting a plurality of wire spring units 4. Frame 3 includes two generally U-shaped rails—a stationary lower U-shaped rail 5 and an upper U-shaped rail 6 which is hinged with its side arms 7 to the side arms 8 of lower rail 5 to permit angular tilting of upper rail 6 with respect to lower rail 5. The position of upper rail 6 with respect to lower rail 5 is selectively controlled by a locking device 10 which embodies a notched cam member 11 rigidly attached to lower U-shaped rail 5 and a spring-pressed pawl 12 pivoted to upper U-shaped rail 6, which pawl cooperates with notches 14 in cam member 11 in locking upper U-shaped rail 6 in predetermined positions to lower U-shaped rail 5. Locking device 10 is readily released by disengaging the pawl 12 from notches 14 of cam member 11 and such disengagement is effected by a handle 15 coupled with pawl 12.

Frame member 3 mounts wire spring units 4 in substantially parallel relation crosswise thereof, each wire spring unit embodying a longitudinally extensible, zig-zag shaped wire seating portion 16 and a longitudinally nonextensible, straight wire back resting portion 17 cooperating with seating portion 16. Although the back resting portions 17 are shown in the drawing as being forwardly curved, such curvature merely provides rearward yieldability in response to the load forces of an occupant's body and does not provide any significant end-to-end elongation of the portions 17 when the entire seat structure is loaded. The back resting portions 17, therefore, are properly designated as being longitudinally non-extensible, and particularly so when considered in relation to the substantial extensibility of the zig-zag seating portions 16 from end-to-end when loaded. Each longitudinally extensible seating portion 16 is mounted on web 18 of lower U-shaped rail 5 by a yieldable lever arm 19 rearwardly and downwardly extended from front end 20 of such seating portion and this lever arm is attached to web 18 by flat loop 21 projected from said web and hook-shaped portion 22 struck up from web 18 to effect a substantially cantilever-like connection with the web 18. The fixed connection of the lower and rearward end of the lever arm 19 to the rail 5 and the yieldability of the lever arm 19 in response to seating loads enables an arcuate movement of the seating portion front end 20 to various positions of balanced response to the normal or static seating load and to shock loads, whereby an effective fore and aft stability is achieved for the wire spring unit 4. The longitudinally non-extensible, straight wire back resting portion 17 includes a straight, generally U-shaped wire body 23 with elongated arms 24 and 25 which are vertically offset near their end portions 26, 27 and extended through apertures 28, 29 in web 30 of upper U-shaped rail 6 for suspending back resting portion 17 in substantially cantilever-like fashion from frame 3.

Figure 11:
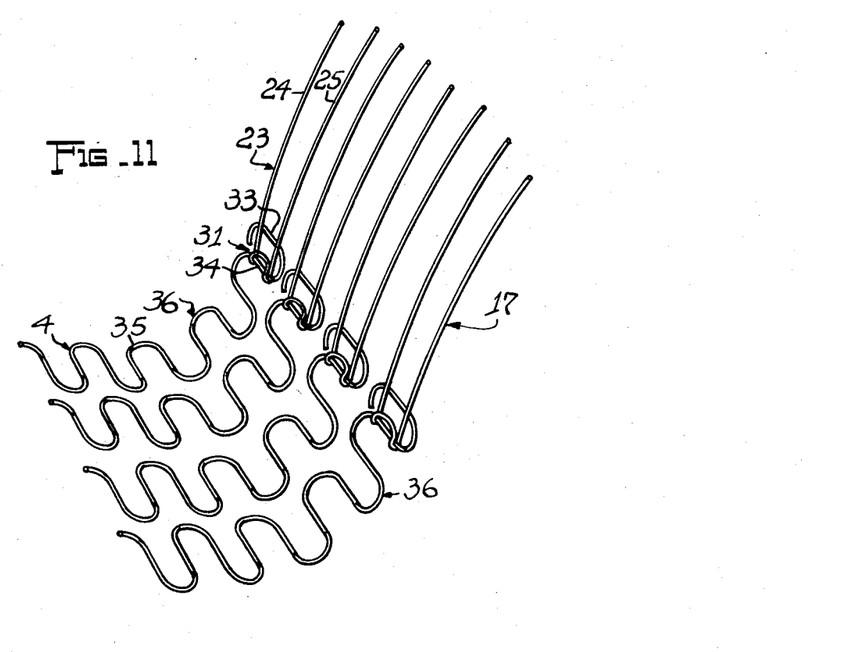
Fig. 11 is a fragmentary perspective view of a plurality of wire spring units in opened up position.
Figure 12:
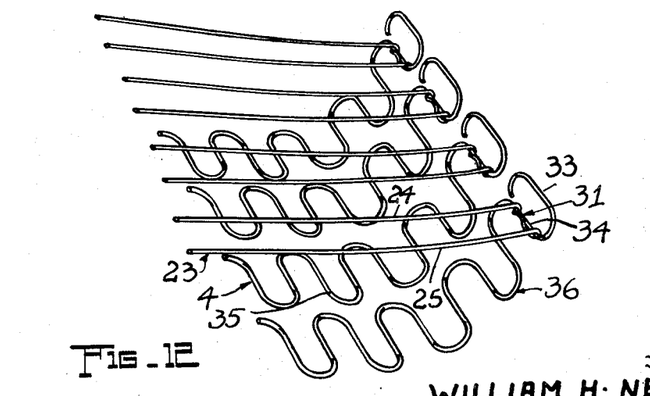
Fig. 12 is a view similar to Fig. 11, with the wire spring units shown in folded position.

Longitudinally extensible seating portion 16 and longitudinally non-extensible back resting portion 17 of each wire spring unit are coupled with each other in cantilever-like fashion by hook-shaped configuration 31 at U-shaped end portion 32 of straight wire body 23. This hook-shaped configuration is extended through seating portion 16 between adjacent wire cross members 33, 34 near the end of the seating portion and pivotally connected to wire cross member 34 to suspend rear portion 35 of seating portion 16 from back resting portion 17, thus effecting a cantilever-like connection of the back resting portion 17 with the seating portion 16 when the back resting portion is forced rearwardly and a pivotal connection of back resting portion 17 with seating portion 16 when the back resting portion is tilted in a forward direction. This dual functional action of the cantilever-like coupling is best seen in comparative Figs. 11 and 12.

Alignment of seating portion 16 with back resting portion 17 is effected by providing rear end portion 35 of seating portion 16 with a rearwardly and upwardly extended sweep 36 of substantial arcuate length, merging or blending with the back resting portion 17, and contributing to proper reclining of the back resting portion 17 and proper support of an occupant. The sweep 36 enables bending or opening movement of the wire springs at the zone of interconnection between the back resting portion 17 and the seating portion 16 to be distributed over a substantial length of arc, thereby contributing to a stretch movement of the seating structure toward effective hugging support of the body load in full conformity with the body load shape. The localized bending characteristic of any sharp or angular spring form at this bending zone would prevent the achievement of such "stretch-hugging" of the body load shape. The proper reaction or response of the seating and back resting portions is facilitated and may be predetermined by differentiating the flexibility of the wires forming portions 16 and 17. In practice, the wire of the back resting portion is substantially more flexible or bendable, as distinguished from extensible, than that of the seating portion by being of smaller diameter or cross-section.

Wire spring units 4 are connected to each other by U-shaped edge wire members 37, 38, the U-shaped edge wire member 37 forming the border wire for seating area 39 of front seat spring construction 2 and U-shaped edge wire member 38 forming the border wire for the back resting area 40 of the front seat spring construction.

Figures 9, 10:
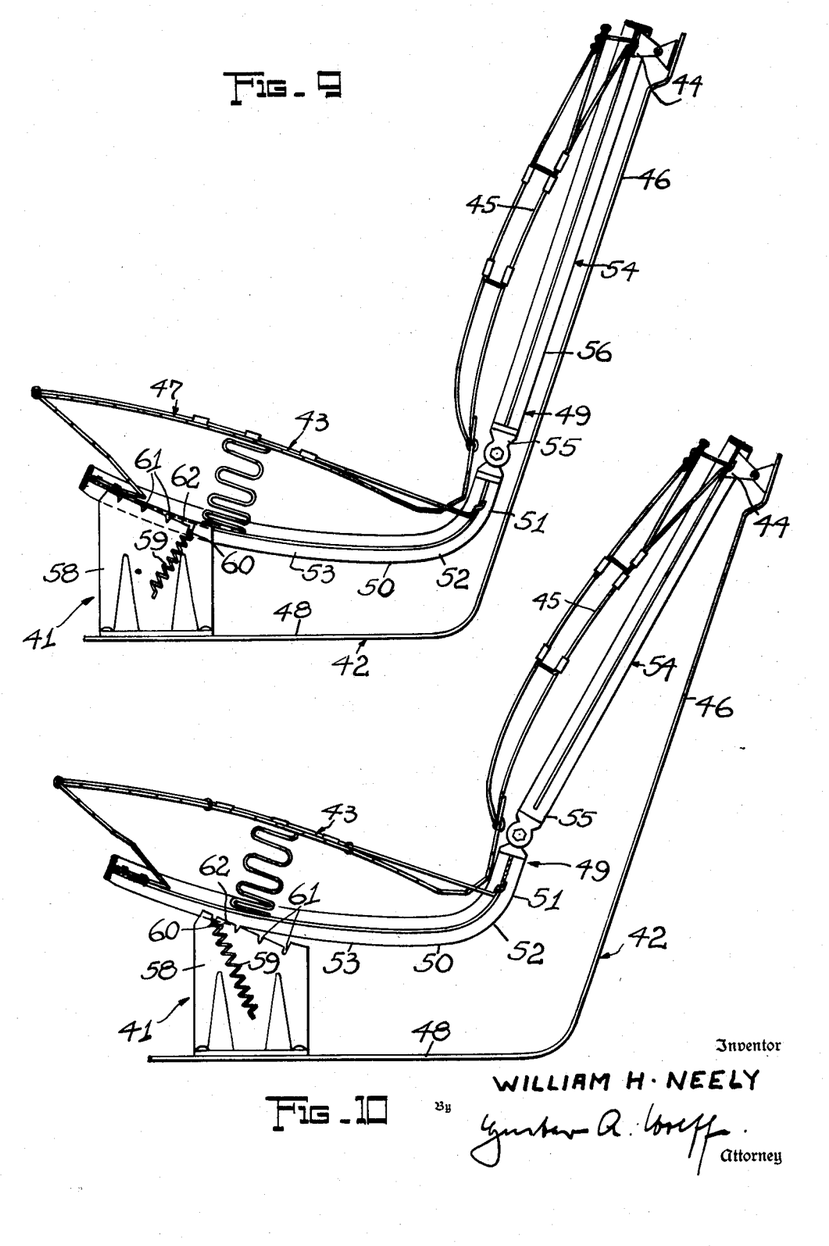
Fig. 9 is a transversal sectional view through a non-foldable wire spring construction.
Fig. 10 is a transversal sectional view similar to Fig. 9, showing the wire spring construction in reclined position.

Wire spring units 4 are usable in reclinable and foldable automobile front seat spring constructions (see Figs. 1 to 5), but may readily be applied to automobile back seat spring constructions, chair seat spring constructions, and other fixed seating arrangements. Such use is shown in Figs. 9 and 10 in which spring construction 41 includes an L-shaped frame member 42 adjustably supporting an L-shaped spring seat structure 43 hinged with upper end 44 of back resting portion 45 to vertical branch 46 of frame member 42. Spring seat structure 43 has its seating portion 47 shiftably mounted on horizontal branch 48 of frame member 42 and includes an L-shaped frame member 49 of two U-shaped frame portions, a generally horizontally extended U-shaped frame portion 50 including a rearwardly and upwardly extended sweep 51 in the end portions 52 of side flanges 53 and a generally vertically extended U-shaped back rest frame portion 54 pivoted with the end portions 55 of side flanges 56 to end portions 52 of side flanges 53. The upper end 57 of back rest frame portion 54 is hinged to the vertical branch 46 of frame member 42 and the seat frame portion 50 is shiftably mounted on brackets 58 on horizontal branch 48 and releasably held in adjusted position on brackets 58 by tension springs 59 connected to brackets 58 and side flanges 53 of seat frame portion 50 to secure same in the desired predetermined position when end portions 60 of tension springs 59 engage V-shaped slots 61 in rearwardly inclined upper edges 62 of brackets 58.

Spring construction 41 with wire spring units 4, mounted and interconnected as previously described, can be shifted into reclined position by shifting seat frame portion 50 from its position shown in Fig. 9 to position shown in Fig. 10. This shifting of seat frame portion 50 tilts the back rest frame portion 54 with respect to seat frame portion 50 and such tilting may be influenced by the inclination of upper edges 62 of brackets 58 previously described as rearwardly inclined.

Figure 1:
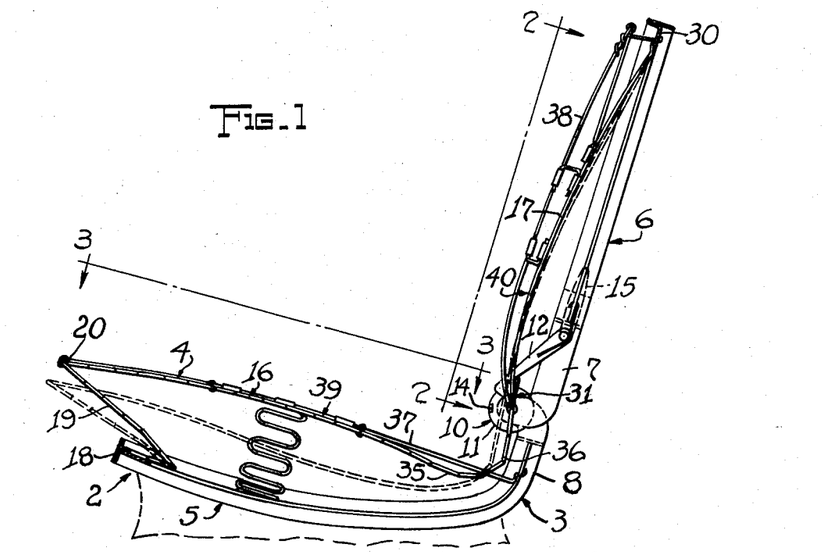
Fig. 1 is a transversal sectional view through a foldable wire spring construction according to the invention, indicating the spring elements unloaded in solid lines and loaded in dotted lines.
Figure 2:
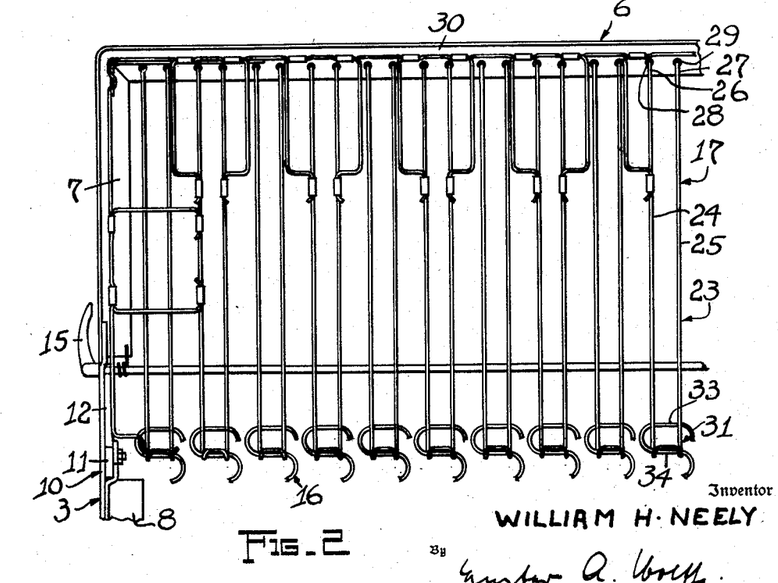
Fig. 2 is a fragmentary front view of the wire spring construction shown in Fig. 1 taken from line 2—2 of Fig. 1.
Figures 3, 4:
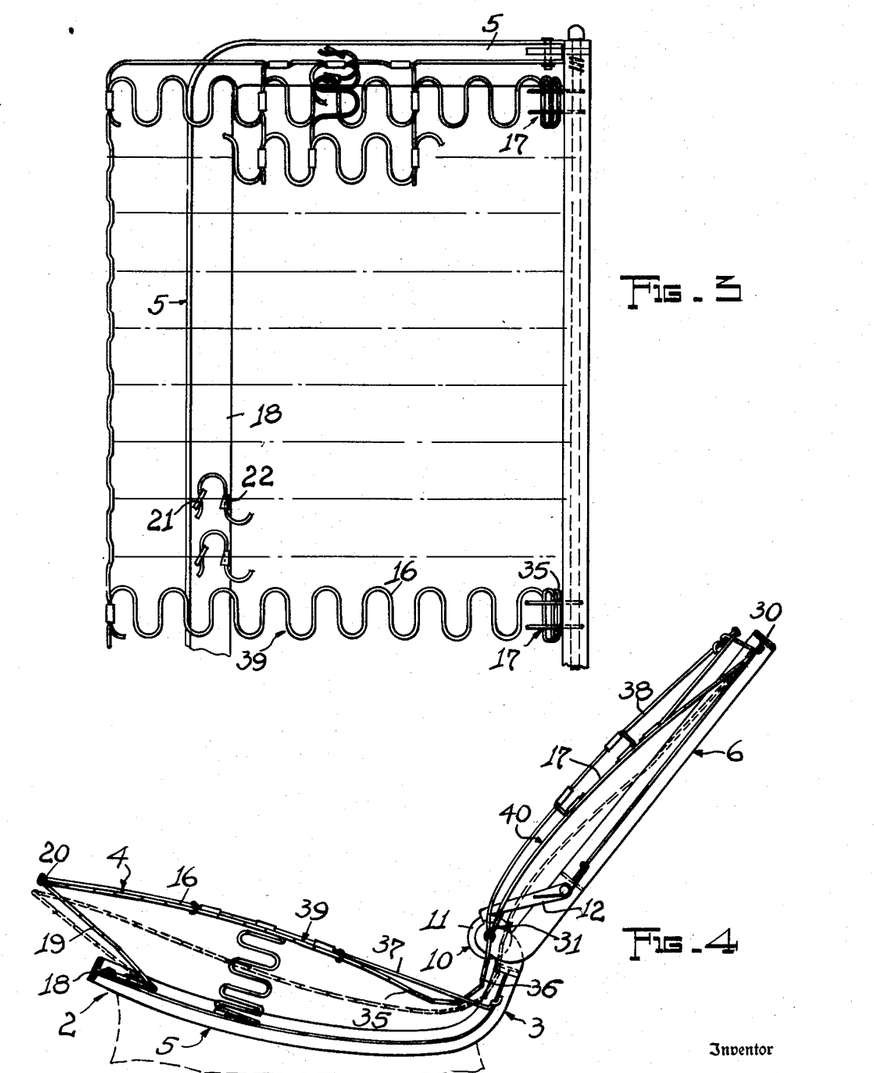
Fig. 3 is a fragmentary plan view of the wire spring construction shown in Fig. 1 taken from line 3—3 of Fig 1.
Fig. 4 is a transversal sectional view similar to Fig. 1, showing the wire spring construction in reclined position, indicating the spring elements unloaded in solid lines and loaded in dotted lines.
Figure 5:
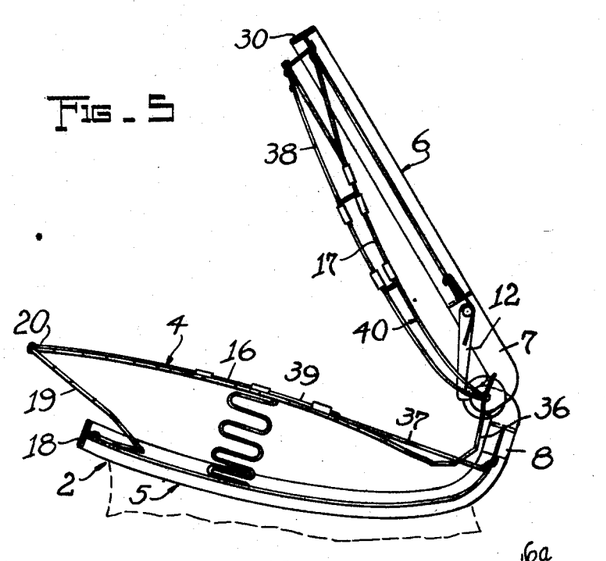
Fig. 5 is a transversal sectional view similar to Fig. 1, showing the wire spring construction in folded position.
Figures 6, 6A, 7, 8:
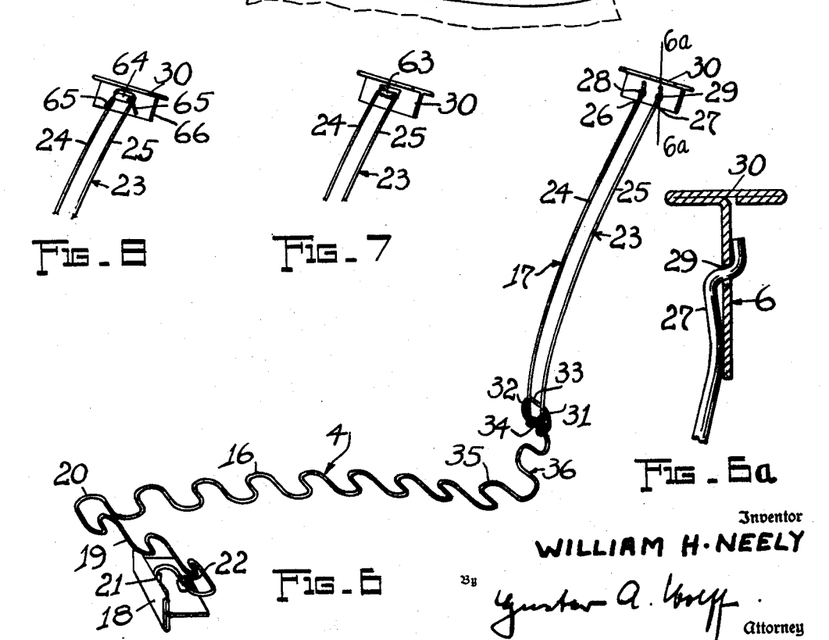
Fig. 6 is a perspective view of one of the wire spring units of the wire spring construction.
Fig. 6a is a fragmentary cross-sectional view taken on line 6a—6a of Fig. 6.
Fig. 7 is a fragmentary perspective view of a modified form of the suspended upper end of the back resting portion of a wire spring unit.
Fig. 8 is a fragmentary perspective view of another modified form of the suspended upper end of the back resting portion of a wire spring unit.

Suspension of back resting portion 17 from web 30 of U-shaped upper rail 6 can be effected by a cantilever-like attachment as shown in Figs. 6 and 6a, by a pivot-like attachment as shown in Fig. 7 having wire body 23 of back resting portion 17 hinged to a tongue-like struck up portion 63 of web 30, or by a pretensioned pivot-like attachment as shown in Fig. 8 in which wire body 23 of back resting portion 17 includes short arms 24, 25 pivoted in tongue-like struck up portion 64 of web 30 and provided with end portions 65 angularly related to the axis of wire body 23 to yieldingly force back resting portion 17 in a direction away from central flange 66 of T-shaped web 30.

Seat spring constructions of the type described mount their generally L-shaped wire spring units on generally L-shaped frame structures by supporting the front portions of the longitudinally extensible seating portions in cantilever-like fashion upon the horizontal branch of the L-shaped frame and suspending the longitudinally non-extensible back resting portions from the vertical branch of the L-shaped frame. A cantilever-like mounting of the front ends of the longitudinally extensible seating portions provides same with yielding front edges and insures fore and aft or horizontal stability for the wire spring units, and suspension of the longitudinally non-extensible back resting portions, which are connected to the longitudinally extensible seating portions, effects suspension of the rear ends thereof, provides vertical stability for the wire spring units and insures a cooperative stretch-loading action of their "suspended" seating and back resting portions for huggingly supporting an occupant by contacting substantial areas of the body load shape, thus eliminating excessive localized stresses in the wire spring units under normal and shock loads.

Proper hugging support of body load shapes by the described wire spring seating construction is effected by the response of the construction to body load forces thereon. Independent stretch-loading of each spring element collectively effects a cooperating interaction of the seat back and sweep portions to provide substantially full supporting contact with the body load shape of an occupant, while avoiding excessive gripping of the occupant but insuring yielding contact of the lower part of the back resting portion with the hollow of the occupant's back.

Figure 13:
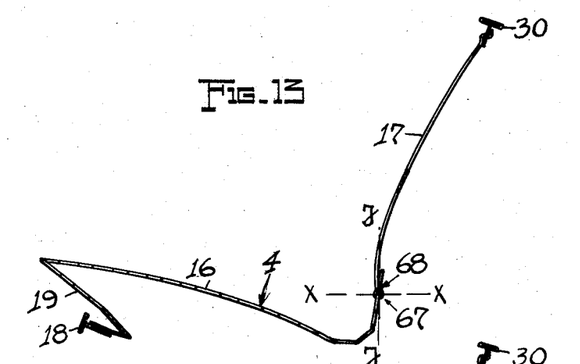
Fig. 13 is a diagram of a mounted wire spring unit in normal position and unloaded.
Figures 14, 15:
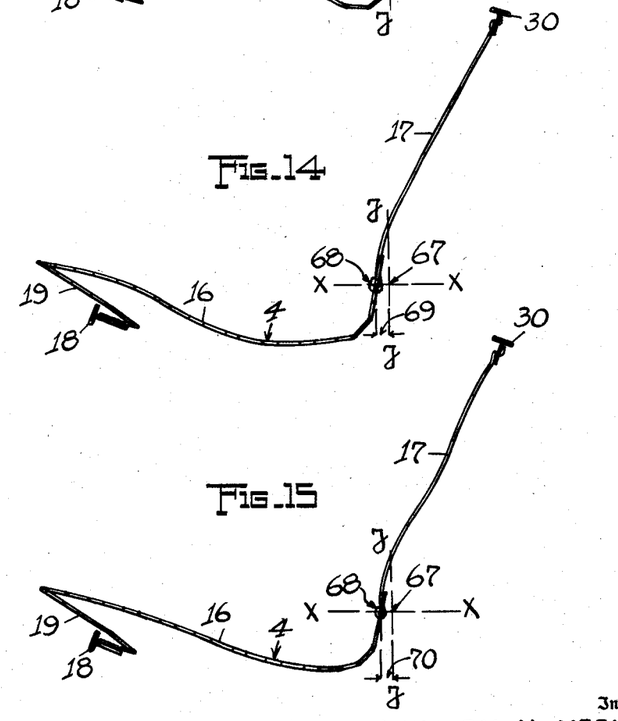
Fig. 14 is a diagram of the wire spring unit when seat-loaded.
Fig. 15 is a diagram of the wire spring unit when fully loaded.

Action of the seat spring constructions, unloaded or fully loaded, is best understood by reference to the diagrams of Figs. 13 through 32. These diagrams disclose in Fig. 13 a wire spring unit 4 including a reference pivot 67 axially aligned with the hook-shaped centilever-like connection 68 of longitudinally extensible seating portion 16 and longitudinally non-extensible back resting portion 17, as indicated by intersected rectangularly related lines x—x and y—y. Loading of the longitudinally extensible seating portion 16 of wire spring unit 4 without its back resting portion results in shifting cantilever-like connection 68 in a forward direction, see Fig. 14, defining the distance between pivot 67 and cantilever-like connection 68 by numeral 69. Loading of longitudinally extensible seating portion 16 and longitudinally non-extensible back resting portion 17 by a person properly seated on the seat spring construction is shown in Fig. 15, disclosing that part of the load is carried by longitudinally non-extensible back resting portion 17 resulting in flattening out of seating portion 16 with the effect of shifting cantilever-like connection 68 toward pivot 67 as indicated by distance 70 which is smaller than distance 69.

Figure 16:
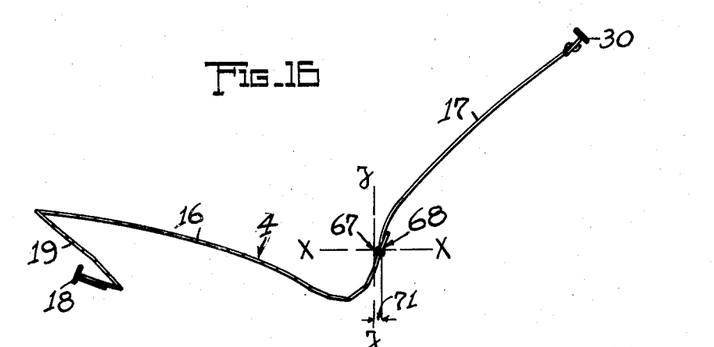
Fig. 16 is a diagram of the wire spring unit in reclined position when unloaded.
Figure 17:
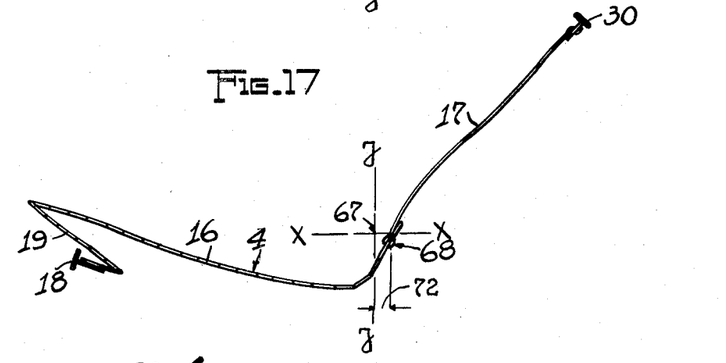
Fig. 17 is a diagram of the wire spring unit in reclined position when fully loaded.
Figure 18:
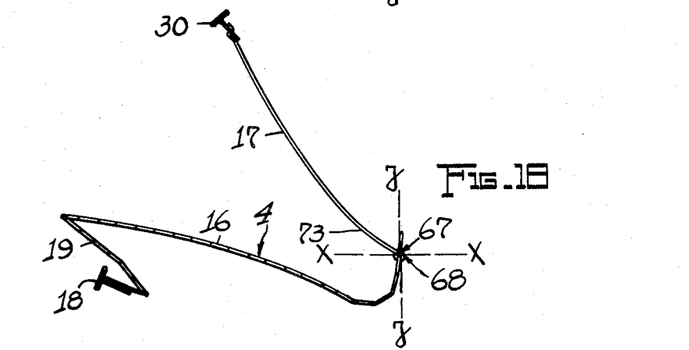
Fig. 18 is a diagram of the wire spring unit when in folded position.

Seat spring constructions of the type described, when loaded in normal seating position effect a shifting of the cantilever-like connection 68 in a forward direction, and, when loaded in reclined position, effect a shifting of the cantilever-like connection 68 in a rearward direction, as best seen in Figs. 16 and 17. Thus, Fig. 16 shows a reclined, unloaded seat spring construction and Fig. 17 a reclined, fully loaded seat spring construction. Cantilever-like connection 68 has been shifted in a backward direction, the distance 71 between pivot 67 and cantilever-like connection 68 in Fig. 16 being smaller than distance 72 between pivot 67 and cantilever-like connection 68 in Fig. 17. Fig. 18 discloses the seat spring construction in unloaded condition, with back resting portion 17 folded upon seating portion 16. The back resting portion is curved at its lower end portion 73, as indicated in Figs. 13 through 18, for cooperation with seating portion 16 to effect yielding contact of portion 73 with the hollow of an occupant's back. It is of particular importance to note that the reference pivot point 67, which represents the point of frame pivoting for folding and reclining movements of the seating construction, axially coincides with the combined pivot and cantilever-like connection 68. It is necessary to provide this coincident location of pivot 67 and connection 68 in the unloaded normal seating position of Fig. 13 so that the axes defined thereby will remain in immediately adjacent relation when the construction is subjected to the folding and reclining action of Figs. 16 and 18 to avoid distortion of the suspended structure relative to its supporting frame means.

Figure 19:
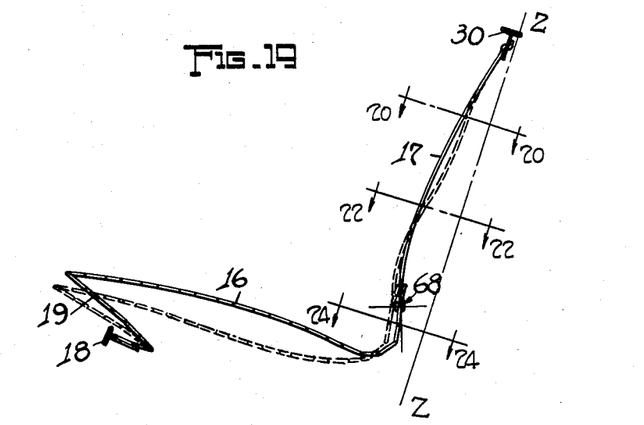
Fig. 19 is a diagrammatic cross-sectional view of the wire spring construction in normal seating position, showing the spring elements unloaded in solid lines and loaded in dotted lines.
Figure 20:
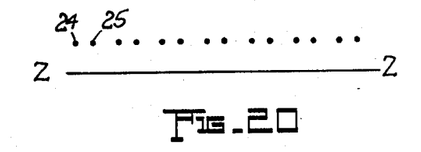
Fig. 20 is a sectional view taken on line 20—20 of Fig. 19, the wire spring construction being unloaded.
Figure 21:
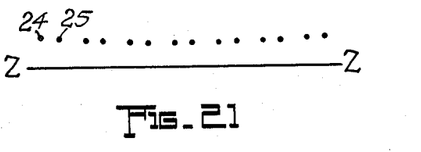
Fig. 21 is a sectional view similar to Fig. 20, the wire spring construction being fully loaded.
Figure 22:
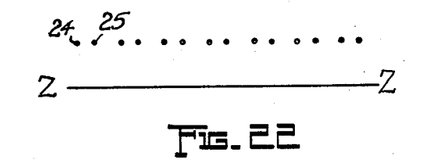
Fig. 22 is a sectional view similar to Fig. 20 taken on line 22—22 of Fig. 19.
Figure 23:
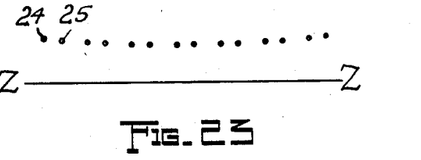
Fig. 23 is a sectional view similar to Fig. 22, the wire spring construction being fully loaded.
Figure 24:
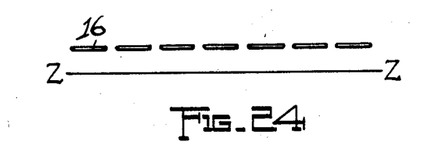
Fig. 24 is a sectional view on line 24—24 of Fig. 19, the wire spring construction being unloaded.
Figure 25:
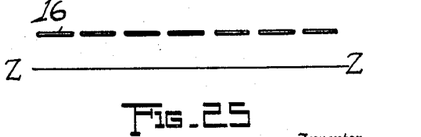
Fig. 25 is a sectional view similar to Fig. 24, the wire spring construction being fully loaded.

The floating action of cantilever-like connection 68 varies with seating and load conditions and effects shape and form of back resting portion 17, as shown in Figs. 19 through 32. Fig. 19 diagrammatically discloses in full and dotted lines the shape of the seat spring construction in unloaded, normal and fully loaded condition with respect to straight reference plane z—z, a shape which is more clearly disclosed in the cross sections of Figs. 20 through 25 by the relative positions of the back resting portions with respect to plane z—z.

Figure 26:
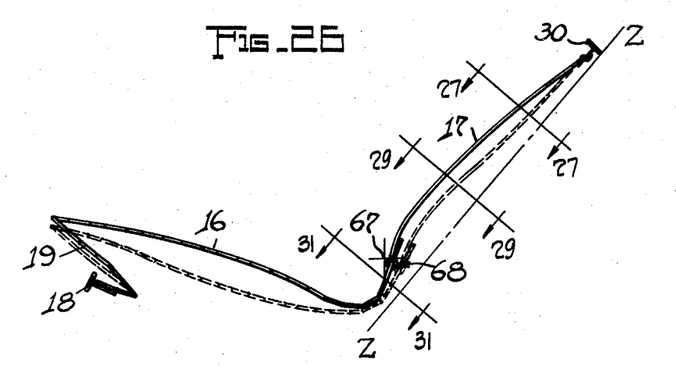
Fig. 26 is a diagrammatic cross-sectional view of the wire spring construction in reclined position showing the spring elements unloaded in solid lines and loaded in dotted lines.
Figure 27:
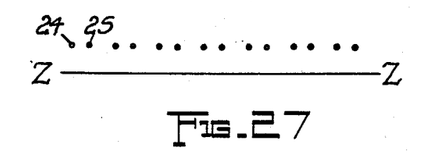
Fig. 27 is a sectional view taken on line 27—27 of Fig. 26, the wire spring construction being unloaded.
Figure 28:
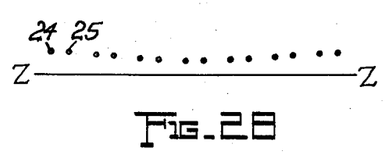
Fig. 28 is a sectional view similar to Fig. 27, the wire spring construction being fully loaded.
Figure 29:
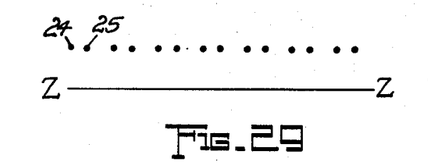
Fig. 29 is a sectional view similar to Fig. 26, taken on line 29—29 of Fig. 26.
Figure 30:
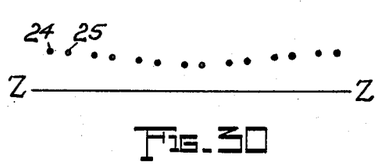
Fig. 30 is a sectional view similar to Fig. 29, the wire spring construction being fully loaded.
Figure 31:
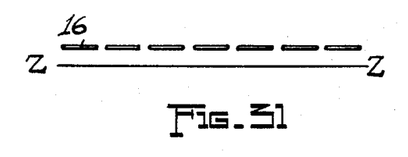
Fig. 31 is a sectional view on line 31—31 of Fig. 26, the wire spring construction being unloaded.
Figure 32:
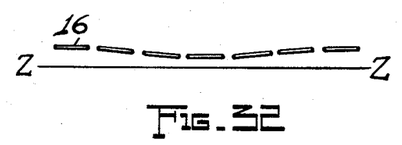
Fig. 32 is a sectional view similar to Fig. 31, the wire spring construction being fully loaded.

Fig. 26 discloses in full and dotted lines the shape of the seat spring construction when reclined in unloaded and fully loaded conditions, respectively, in a manner similar to Fig. 19. The described seat spring construction and its diagrams of Figs. 27 through 32 for unloaded, fully loaded, normal and inclined positions provide a hugging seating and resting spring foundation which can readily be upholstered by limited amounts of upholstery material without effecting seating and resting comfort of the finished upholstered seat spring structure.

In summary, the principles and features of the present invention are characterized by "suspended" wire springs which respond to the weight loading by stretching and conforming toward or hugging against the load shape. This suspended, stretch condition of the wire springs is achieved and controlled by the structural features of: a longitudinally extensible, generally horizontal seating portion and a longitudinally non-extensible, generally vertical back resting portion; a yieldable, cantilever-like connection of the forward end of the seating portion to a fixed supporting means; an upwardly extended curved sweep of the rear end of the seating portion; a merging of the seating portion sweep with the lower end of the back resting portion; and, for folding seat applications, a combined cantilever-like and pivotal connection between the seating and back resting portions. The wire forming the seating portion is of zig-zag shape to provide substantial longitudinal extensibility, whereas the wire forming the back portion is relatively straight, non-extensible, and of greater flexibility relative to the seating portion.

Further attention is called to my co-pending application Serial No. 703,067, filed December 16, 1957.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A spring unit for seat spring constructions comprising a resilient, longitudinally extensible, generally horizontal seat portion and a resilient, longitudinally non-extensible, generally vertical back rest portion, said seat and back rest portions being overlapped, merged and connected with each other, and attaching means at the free ends of the seat portion and the back rest portion.

2. A seat spring construction as described in claim 1, wherein the longitudinally extensible seat portion includes an upwardly and rearwardly extended curved sweep, wherein the longitudinally non-extensible back rest portion overlaps and merges with the upwardly extended curved sweep of the seat portion, and wherein the back rest portion is connected in cantilever-like fashion to the seat portion when tilted rearwardly and in a hinge-like fashion when tilted forwardly.

3. In a seat spring construction, the combination of vertically spaced, laterally offset, lower and upper supporting means and a wire spring including a longitudinally extensible, generally horizontal seat portion and a longitudinally non-extensible, generally vertical back rest portion, said seat and back rest portions being overlapped, merged and interconnected with each other, said seat portion having its front end secured in elevated position to the lower supporting means and said back rest portion having its upper end secured to and suspended from the upper supporting means.

4. In a seat spring construction, the combination of vertically spaced, laterally offset lower and upper supporting members and a wire spring, said wire spring including a longitudinally extensible, generally horizontal seat portion provided at its rear end with an upwardly extended curved sweep, and a longitudinally non-extensible, generally vertical back rest portion, the sweep of the seat portion and the back rest portion being overlapped, merged and connected with each other, said wire spring having the front end of its seat portion yieldably attached to the lower supporting member to extend forwardly and upwardly thereof and attain fore and aft stability and said wire spring having its back rest portion suspended from the upper supporting member to attain vertical stability.

5. In a seat spring construction, the combination of vertically spaced, laterally offset lower and upper supporting means and a pluraltiy of wire springs arranged side-by-side, each wire spring including a longitudinally extensible, generally horizontal seat portion, and a longitudinally non-extensible, generally vertical back rest portion overlapping and merging into the seat portion, said seat portion having its front end secured in elevated yielding position to the lower supporting means and said back rest portion being secured to and suspended from the upper supporting means, whereby the application of shaped body load forces to the construction effects independently in each wire spring a stretching and bending of the longitudinally extensible seat portion, a bending of the longitudinally non-extensible back rest portion and a collective cooperating interaction of the seat and back rest portions for supporting the body load shape in conformity therewith.

6. In a seat spring construction, the combination of a frame embodying laterally and vertically offset top and bottom rails hinged to each other and L-shaped wire spring units having their free ends secured to said top and bottom rails respectively, each wire spring unit including a longitudinally elongated, flexible and generally horizontal seat portion and a longitudinally elongated, flexible and generally vertical back rest portion, said back rest portion being connected to the seat portion in cantilever-like fashion when tilted in a direction away from the seat portion and in hinge-like fashion when tilted in a direction toward the seat portion.

7. In a seat spring construction, the combination of a frame embodying laterally and vertically offset top and bottom rails hinged to each other and L-shaped wire spring units, each spring unit including a longitudinally extensible, elongated, generally horizontal seat portion formed from zig-zag shaped wire and a longitudinally non-extensible back rest portion formed from straight wire, said back rest portion being connected to the seat portion in cantilever-like fashion when tilted in a direction away from the seat portion and in hinge-like fashion when tilted in a direction toward the seat portion, said seat portion including a front portion yieldably attached to the bottom rail of the frame forwardly and upwardly thereof, and said back rest portion including at its top means for suspending the back rest portion from the top rail of the frame.

8. A spring unit for seat spring constructions comprising wire means formed to provide a resilient zig-zag shaped longitudinally extensible seat portion having an upwardly extended curved sweep, and a resilient longitudinally non-extensible back rest portion overlapping with its lower end said curved sweep and including directly above the curved sweep a portion extended in a forward direction with respect to the sweep, and attaching means at the free ends of the wire means.

9. In a seat spring construction, the combination of vertically spaced, laterally offset, hinged lower and upper supporting means and a wire spring, said wire spring having a generally horizontal seat portion secured to the lower supporting means and including at its rear end an upwardly extended curved sweep and a generally vertical back rest portion suspended from the upper supporting means, the curved sweep of the seat portion and the back rest portion being overlapped, merged and connected with each other to provide a cantilever-like connection effecting in rearwardly inclined positions of the back rest portion with respect to the seat portion yielding opening up of the curved sweep, causing an increase of the load resistance of the back rest portion.

10. In a seat spring construction, the combination of vertically spaced, laterally offset, lower and upper supporting members and a wire spring, said wire spring including a longitudinally extensible, generally horizontal seat portion provided at its rear end with an upwardly extended curved sweep, and a longitudinally non-extensible, generally vertical back rest portion, said seat portion including a front end portion having lever means extending rearwardly and downwardly therefrom and fixedly secured to said lower supporting member, said lever arm normally positioning said front end portion in substantial forward overhanging relation above said lower supporting member for arcuate forward and downward yieldable movement in response to a seating load while restraining rearward movement thereof, thereby to attain fore and aft stability of said seat portion as said curved sweep is freely suspended from said back rest portion, and said wire spring having its back rest portion freely suspended from the upper supporting member to attain vertical stability.

References Cited in the file of this patent

UNITED STATES PATENTS

| 2,669,290 | Neely | Feb. 16, 1954 |

FOREIGN PATENTS

| 635,466 | Great Britain | April 12, 1950 |
| 645,113 | Great Britain | Oct. 25, 1950 |